United States Patent
Pudenz

(10) Patent No.: US 12,554,959 B2
(45) Date of Patent: Feb. 17, 2026

(54) READING AN RFID TRANSPONDER ON AN OBJECT IN AN APPARATUS

(71) Applicant: SICK AG, Waldkirch (DE)

(72) Inventor: Florian Pudenz, Waldkirch (DE)

(73) Assignee: SICK AG, Waldkirch (DE)

( * ) Notice: Subject to any disclaimer, the term of this patent is extended or adjusted under 35 U.S.C. 154(b) by 2 days.

(21) Appl. No.: 18/763,404

(22) Filed: Jul. 3, 2024

(65) Prior Publication Data

US 2025/0013849 A1    Jan. 9, 2025

(30) Foreign Application Priority Data

Jul. 4, 2023 (DE) .......................... 102023117578.5

(51) Int. Cl.
    G06K 19/077    (2006.01)
    G06K 7/10      (2006.01)

(52) U.S. Cl.
    CPC ....... G06K 19/077 (2013.01); G06K 7/10297 (2013.01)

(58) Field of Classification Search
    CPC ..................... G06K 19/077; G06K 7/10297
    USPC ............................................... 235/451
    See application file for complete search history.

(56) References Cited

U.S. PATENT DOCUMENTS

| | | | |
|---|---|---|---|
| 2,518,371 A | 8/1950 | Ponte et al. | |
| 6,320,509 B1 | 11/2001 | Brady et al. | |
| 6,441,740 B1 | 8/2002 | Brady et al. | |
| 7,994,962 B1 | 8/2011 | Ben-Shmuel | |
| 2002/0167450 A1 | 11/2002 | Korden et al. | |
| 2004/0164864 A1 | 8/2004 | Chung et al. | |
| 2008/0303633 A1 | 12/2008 | Cheng et al. | |
| 2009/0174557 A1 | 7/2009 | Nikitin et al. | |
| 2011/0068987 A1* | 3/2011 | Carr ......................... H01Q 7/00 343/741 |
| 2012/0118977 A1* | 5/2012 | Gao .................. G06K 19/07749 235/492 |
| 2013/0313328 A1 | 11/2013 | Mohajer-Iravani et al. | |
| 2017/0277922 A1 | 9/2017 | Liu et al. | |
| 2017/0293832 A1 | 10/2017 | Pai | |
| 2017/0344772 A1 | 11/2017 | Fislage et al. | |
| 2019/0103862 A1 | 4/2019 | Ido | |

FOREIGN PATENT DOCUMENTS

| | | |
|---|---|---|
| EP | 2677475 A1 | 12/2013 |
| EP | 4300708 A1 | 1/2024 |
| WO | 0021030 A1 | 4/2000 |

* cited by examiner

Primary Examiner — Ahshik Kim

(74) Attorney, Agent, or Firm — Nath, Goldberg & Meyer; Jerald L. Meyer

(57) ABSTRACT

A system is provided of an apparatus (10) for recording at least one object (12a-b) and of an object (12a-b) arranged in the apparatus (10), wherein an RFID transponder (14) having an antenna (15) is arranged at the object (12a-b), and wherein the apparatus has at least one wall (18) and at least one resonant structure (20) spaced apart from the object (12a-b). The resonant structure (20) is here introduced into the wall (18) as a slot structure.

11 Claims, 3 Drawing Sheets

READING AN RFID TRANSPONDER ON AN OBJECT IN AN APPARATUS

BACKGROUND

Field

The invention relates to an apparatus for recording at least one object using an RFID transponder and to a method of reading an RFID transponder on an object in an apparatus.

Description of Related Art

An RFID reading device excites RFID transponders located in its reading range by electromagnetic radiation via its antenna to emit the stored information, receives the corresponding transponder signals, and evaluates them. For this purpose, the UHF (ultra-high frequency) range is frequently used since there is an established framework here with the standard ISO 18000-6 and in addition transponders at different distances from some millimeters up to several meters can be read. UHF RFID transponders are available in very compact construction designs and can also accordingly be attached to very small objects.

An area of use of RFID transponders is a documentation that is as gapless as possible of production processes, for example for quality assurance and traceability. There is frequently the desire also to be able to identify the individual assemblies used after the production of a product. In this respect, RFID transponders have the advantage that an identification is also possible in the interior of a housing, for instance, where optical detections naturally have to fail.

The possible communication range for the wireless transmission and the reception of the electromagnetic waves of the RFID signals is limited here by factors such as free space attenuation, the maximum permitted transmission power fixed inter alia by country-specific standards, the sensitivity of the receiver components, and the antenna gain of both the RFID reading device and the RFID transponder.

The antenna gain of the RFID transponder plays a particularly important role under these factors. This in turn depends above all, in addition to the antenna structure, on the size of the antenna and thus of the RFID transponder. However, particularly small RFID transponders are especially used for the identification of assemblies that are at times themselves very small and whose properties should anyway be influenced as little as possible by the RFID transponder. Their smaller antenna again results in a small reading range so that the RFID transponder can no longer be read in a larger device or in a machine. Metallic housings that prevent or greatly impair a radio connection due to their shielding properties present a further problem.

Respective arrangements are known from U.S. Pat. Nos. 6,320,509 and 6,441,740 in which an RFID transponder is provided with one or more metallic reflectors in the form of straight or curved surfaces to bundle the antenna gain in a preferred direction in this manner. However, reflector surfaces are required for this that are considerably larger than the transponder structures.

Yagi antennas have long been widespread that are based on the directivity of a dipole antenna being able to be bundled in a direction if additional rods of conductive material attuned to the resonant frequency are positioned in front of and behind the dipole antenna. It can used on sides of the RFID reading device such as described in US 2009/0174557 A1. The structures on the sides of the RFID transponder are, however, not least based on other antenna optimizations for space reasons.

An RFID transponder is presented in WO 00/21030 that has an additional element to improve the RFID properties beside its actual antenna structure. However, this is then cast overall so that the RFID transponder has corresponding dimensions to receive the total resulting antenna.

US 2008/0303633 A1 discloses reflectors and directors that are arranged spaced apart from an RFID transponder to form Yagi antennas that can double a reading range. However, this does not yet solve the problem of being able to read into the interior of a device, in particular through a metallic sleeve, and can also not be used if no construction space is available in the interior.

An RFID signal is forwarded to the interior of a vehicle by means of coaxial cables in US 2017/0277922 A1. However, this requires a great effort and space requirements.

U.S. Pat. No. 7,994,962 B1 discloses a method of concentrating RF radiation onto an object by means of reflectors in dimensions that would not be usable for the marking of assemblies.

SUMMARY

It is therefore the object of the invention to further improve the reading of RFID transponders.

This object is achieved by an apparatus for recording at least one object using an RFID transponder and by a method of reading an RFID transponder on an object in an apparatus in accordance with the respective independent claim. The apparatus is, for example, an electronic device, a vehicle, a machine, or a part thereof, in particular an enveloping construction or housing or one carrying objects. The apparatus has at least one wall so that an interior and an exterior can in particular be distinguished with respect to the wall. The object can be an assembly or components thereof and is marked by an RFID transponder to identify it by means of an RFID reading device. The RFID transponder has an integrated antenna. Its effective antenna gain and thus the reading range is increased by at least one resonant structure spaced apart from the object and thus also from the RFID transponder with its antenna.

The invention starts from the basic idea of implementing the resonant structure together with the wall. It is introduced into the wall as a slot structure for this purpose. If an RFID reading device now reads from the side of the wall remote from the RFID transponder, the slot structure effectively acts as an extension of the antenna of the RFID transponder.

The invention has the advantage that an improvement of the transmission and reception properties of the RFID transponder is achieved by which the reading range is increased. It thereby also becomes possible to communicate with particularly small or compact RFID transponders of different constructions that originally have too small an antenna gain, were too far away, or would not be detected due to shielding effects or damping, in particular of the wall. The RFID transponders themselves do not have to be subsequently modified for this purpose. The attachment of the slot structure requires only a little effort and no additional material costs at all.

The apparatus is preferably configured as a housing or as a covering. The wall preferably terminates the housing in one direction. The housing can be the outer housing of an electronic device, but also an interior housing of a component or of a module. A plurality of part housings are thus equally conceivable such as a plurality of objects within a housing of which one, several, or all the objects may be marked by one or more RFID transponders.

The wall is preferably a metallic wall. A housing of the apparatus is preferably composed of metal overall. An example is the metallic outer skin of a vehicle. Nothing at all could be read through a metallic wall or sleeve due to the shielding effect in accordance with the prior art. The slot structure not only makes the wall effectively transparent for the RFID signal, but also increases the reading range in this respect. A metal element can be introduced into a non-metallic wall with the slot structure, for example.

The resonant structure is preferably attuned to a wavelength of the RFID transponder. A structure size of half the wavelength of the RFID transponder can in particular be selected. The required size is thus easy to estimate and the slot structure can remain very small. It would be approximately 17.3 cm, for example, at an RFID frequency of 866.5 MHz This size does not have to be exactly observed; the resonance deteriorates with differences, but a significant, albeit not the greatest possible, range increase is still achieved.

The resonant structure is preferably arranged at a distance from the object attuned to a wavelength of the RFID transponder. The distance in particular amounts to a quarter of the wavelength of the RFID transponder. Since the arrangement of the object with respect to the wall is typically not aligned to the requirements of the RFID reading, there is frequently only the choice of which wall should be provided at a suitable distance from the object with the slot structure. The optimum distance is then only approximately reached as a rule. As already in the case of the size of the resonant structure, even an approximately observed ideal distance already produces a range increase.

The object preferably has at least one second resonant structure. The second resonant structure cooperates with the slot structure to additionally improve the directivity or range increase. Different construction forms are conceivable for the second resonant structure such as wire, an electrical conductive track on a circuit board, a metalized film having an adhesive layer, a metallic print, or an integration of metallic particles in plastic, in particular by means of 3D printing. If a further wall is available or added at a suitable position, the second resonant structure can likewise be a slot structure.

The second resonant structure is preferably arranged as a director between the slot structure and the object. The second resonant structure is then disposed in the propagation path of the RFID signal between the RFID transponder and the RFID reading device. Alternatively, the second resonant structure is arranged as a reflector in an extension of the connection of the slot structure and the object and is thus equally arranged behind the actual propagation path. It is conceivable to provide a third resonant structure or further resonant structures as a director/directors and/or resonator/resonators.

The system preferably has an RFID reading device to read information of the RFID transponder. The RFID reading device preferably comprises at least one separate internal or external antenna, a transceiver connected to the antenna, and an RFID control and evaluation unit connected to the transceiver. The antenna is used by the RFID reading device to transmit RFID signals to the RFID transponder and/or to receive RFID signals from the RFID transponder. Any combination of a transmitter and receiver is called a transceiver here. The RFID control and evaluation unit that has at least one digital processing module such as a microprocessor, an FPGA (field programmable gate array), an ASIC (application specific integrated circuit), or the like is configured for the encoding of RFID information into the RFID signals and/or for reading RFID information from the RFID signals. The transceiver and the RFID control and evaluation unit can form a common processing module or can at least in part use a processing module together. The reading range from which the RFID reading device can read the RFID transponder is increased thanks to the slot structure.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
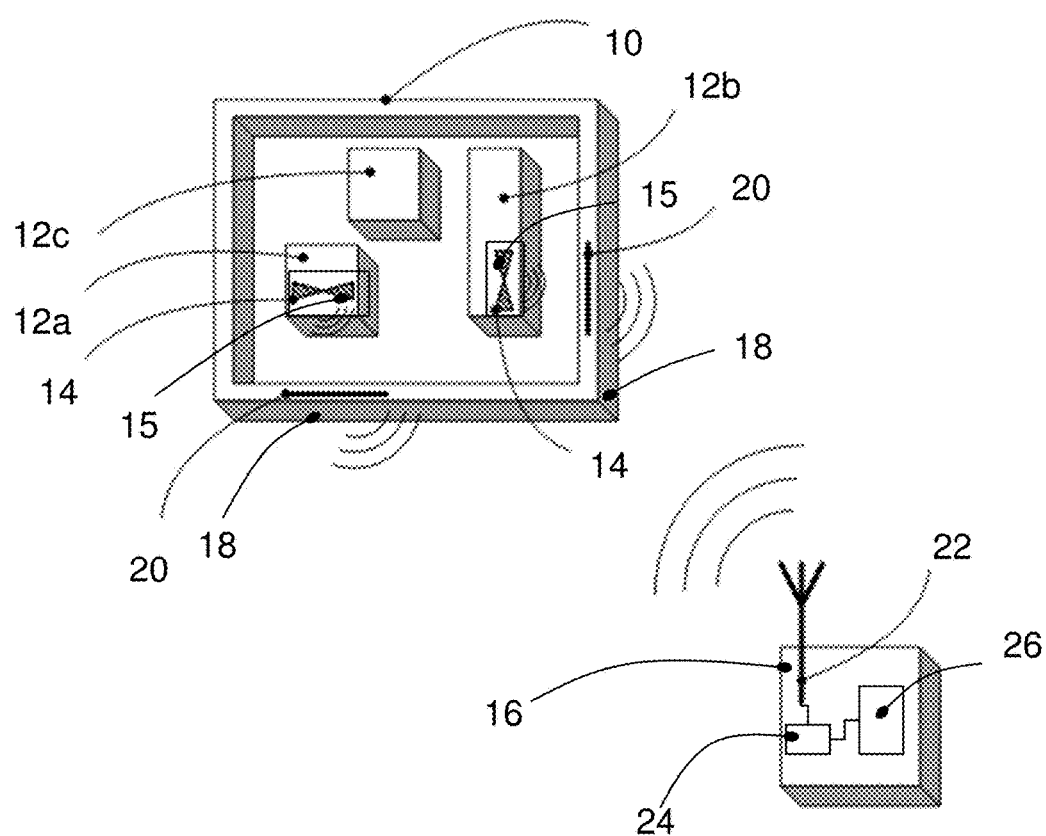
FIG. 1 a schematic overview representation of an apparatus with a plurality of objects or components that are arranged therein and that are at least in part provided with an RFID transponder, and with an RFID reading device.

FIG. 1 shows a schematic overview representation of an apparatus 10, for example an electronic device, having a plurality of objects 12a-c or individual component arranged therein that are at least in part provided with an RFID transponder 14 that has an antenna 15. An RFID reading device 16 can be arranged outside the apparatus 10 to communicate with an RFID transponder 14, in particular to identify an object 12a-c with reference to the RFID transponder 14 attached thereto.

Particularly with small RFID transponders 14, the reading/writing range for a successful communication between the RFID reading device 16 and the RFID transponder 14 is limited. This range can be further degraded by shielding effects of walls 18, for example of a housing of the apparatus 10, and communication can also be completely prevented in the case of a metallic housing.

A resonant structure 20 in the form of a slot structure is therefore provided in at least one wall to improve the communication. Possible aspects and the operation of the slot structure will be explained in more detail below with reference to FIGS. 2 to 4. There is a respective optimum for the position and size of the resonant structure 20 depending on the frequency of the RFID communication. Since the position of the objects 12*a-b* and of the walls 18 is fixed, an optimum position may only be adopted approximately under certain circumstances. The size is also possibly not ideally implementable due to conditions such as the available space. Signal damping is nevertheless reduced and the communication improved or even only made possible at all.

Figure 2:
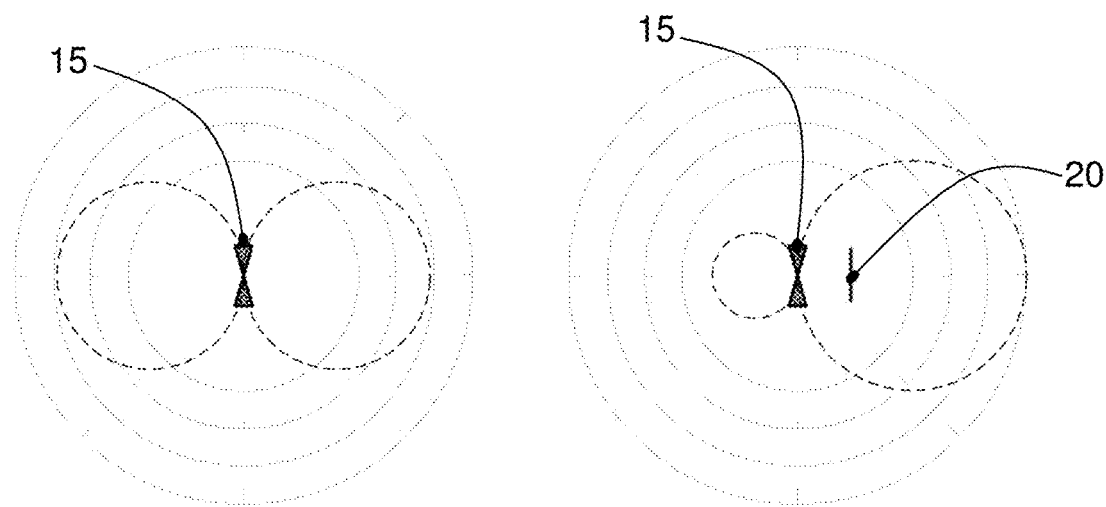
FIG. 2 a schematic representation of the antenna gain of an antenna altered by resonant structure, FIG. 3A a schematic representation of two antennas of an RFID transponder and of an RFID reading device.

The RFID reading device 16 in turn has an antenna 22 that is designed, for example, for the ISM band at approximately 900 MHz An external antenna is also conceivable instead of the internal antenna 22 shown. A transceiver 24 is connected to the antenna 22 and a control and evaluation unit 26 of the RFID reading device 16 is connected to it to evaluate RFID signals received by means of the antenna 22 or to transmit information to the RFID transponder 14 as RFID signals. The control and evaluation unit 26 is preferably connected to a wired or wireless interface, not shown, to exchange data, to carry out parameterizations, and the like. The mode of operation of an RFID reading device, for example for the UHF frequency range (ultrahigh frequency) in accordance with the standard IS 18000-6, is known per se and will therefore not be explained in more detail FIG. 2 shows a schematic representation of the antenna gain of an antenna 15 altered by a resonant structure 20. In this respect, for comparison, the antenna 15 is shown alone on the left side and the antenna with the resonant structure 20 on the right side. For example, a wire having the extent of approximately half a wavelength of 17.3 cm can be selected as the resonant structure 20 for an RFID transponder 14 in the UHF frequency band at 88.5 MHz and can be positioned at a distance of a quarter of the wavelength from the antenna 15. As already mentioned, a favorable effect also occurs when these specifications are only approximately observed and wire of a length of 16 cm is used, for example. The directivity is considerably improved by the resonant structure 20 when reading should take place from the right in the example of the right side of FIG. 2.

Figure 3A:
FIG. 3B a schematic representation of two antennas of an RFID transponder and of an RFID reading device with a resonant structure arranged behind the antenna of the RFID transponder.
FIG. 3C a schematic representation of two antennas of an RFID transponder and of an RFID reading device with a resonant structure arranged in front of the antenna of the RFID transponder.
FIG. 3D a schematic representation of two antennas of an RFID transponder and of an RFID reading device with two resonant structures arranged in front of the antenna of the RFID transponder.
FIG. 3E a schematic representation of two antennas of an RFID transponder and of an RFID reading device with two resonant structures arranged in front of and behind the antenna of the RFID transponder, respectively.
FIG. 3F a schematic representation of two antennas of an RFID transponder and of an RFID reading device with two resonant structures arranged in front of and a third resonant structure arranged behind the antenna of the RFID transponder.
Figure 3B:
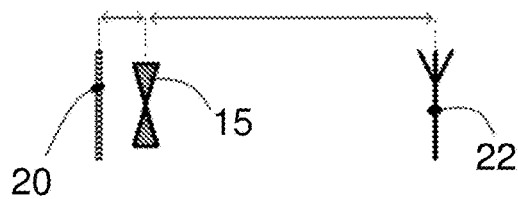
Figure 3C:
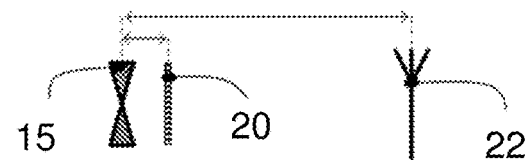

FIGS. 3A-F respectively show schematic representations of an antenna 15 of an RFID transponder 14 and of an antenna 22 of an RFID reading device 16 with different constellations of resonant structures. The situation of only the two antennas without any additional resonant structure is first shown for comparison in FIG. 3A. In FIG. 3B, a resonant structure 20 is arranged behind the antenna 15 of the RFID transponder 14 from the viewpoint of the antenna 22 of the RFID reading device and thus adopts the function of a reflector. The order is reversed in FIG. 3C and the resonant structure 20 is arranged in front of the antenna 15 and thus acts as a director.

Figure 3D:
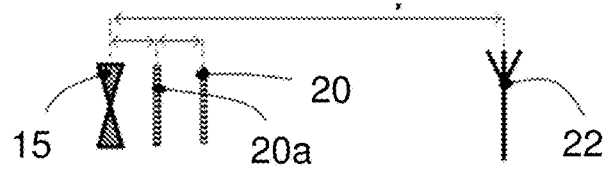
Figure 3E:
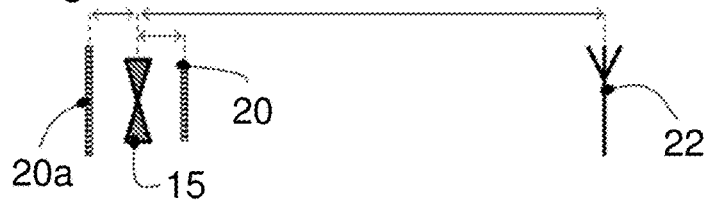
Figure 3F:
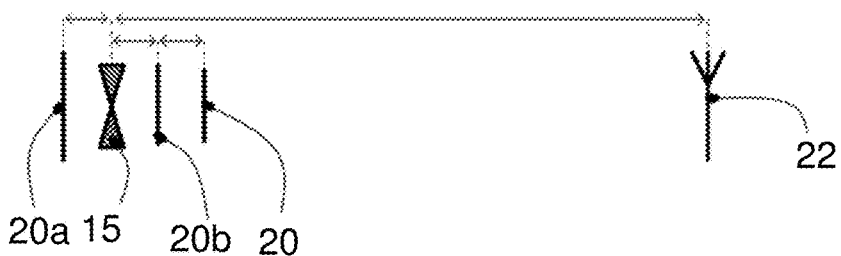

FIGS. 3D-F show constellations in which the resonant structure 20 is complemented by at least one further resonant structure 20*a-b*. In this respect, in principle even more resonant structures and additional combinations of reflectors and directors implemented therewith are also possible. FIG. 3D shows an arrangement with two resonant structures 20, 20*a* in front of the antenna 15 that thus both act as directors. FIG. 3E shows a respective resonant structure 20 in front of the antenna 15 and a respective resonant structure 20*a* behind the antenna 15 and thus a combination of a director and a reflector. In FIG. 3F, a yet further resonant element 20*b* is added to the arrangement of FIG. 3E as a second director as an example for combinations having even more resonant structures.

Figure 4:
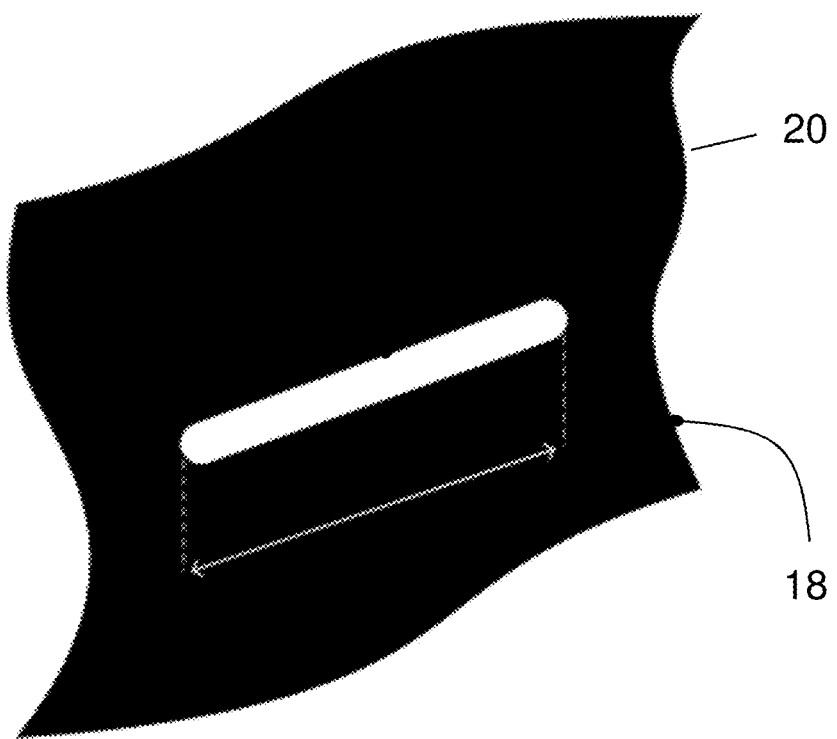
FIG. 4 a schematic representation of a resonant structure configured as a slot structure.

FIG. 4 shows a schematic representation of a resonant structure 20 that is configured as a slot structure and that is introduced into the wall 18. The slot structure acts as a slot radiator or as a slot antenna and is thus likewise able to improve the reading range or to enable a communication into a metallic sleeved apparatus 10 at all. The geometrical demands on the slot or the cutout with respect to extent and position are the same as already discussed.

In an application example, the apparatus 10 is a vehicle, in particular a passenger vehicle. Components such as a seat or a control device are installed therein as objects 12*a-b* bearing the RFID transponders 14. These components should also be identifiable by reading the RFID transponders 14 after the completed vehicle mounting. This would not be possible according to the prior art using an RFID reading device 16 that is arranged in front of the vehicle due to the installation location. In an embodiment of the invention, a resonant structure 20 can now be attached to a side window or plastic covering as a metal part having the slot structure. It is even simpler to introduce the slot structure into the metallic outer skin, with the slot structure then being able to be filled with plastic, for example, to not disturb the overall visual impression. The slot structure makes it possible to continue to identify the components of the completed vehicle from the outside by reading the RFID transponders 14.

In another application example, the apparatus 10 is an electrical device, in particular a large electrical device, such as a flat screen TV, a vacuum cleaner, or a washing machine. A compact RFID transponder 14 that should make it possible to identify a component or also the total electrical device was integrated in the apparatus 10 within the production chain. The transponder size would only permit a reading at a small distance such as less than 10 cm in accordance with the prior art. However, the identification from outside should in particular be possible without dismantling a housing in the case of repair or servicing. A slot structure is therefore now introduced in an embodiment of the invention as a resonant structure 20 into a circuit board above the transponder or a metal element having the slot structure is arranged there; the slot structure is alternatively introduced into an in particular metallic housing wall. The identification can now take place from outside due to the thus improved radiation characteristics of the RFID transponder 14. In addition, a marking can be attached to the housing to indicate the position of an RFID reading device 16 to the user from where the reading of the RFID transponder 14 is particularly easily possible.

The invention claimed is:

1. A system of an apparatus for recording at least one object and of an object arranged in the apparatus, wherein an RFID transponder having an antenna is arranged at the object, wherein the apparatus has at least one wall and at least one resonant structure spaced apart from the object, with the resonant structure being introduced into the wall as a slot structure, wherein the resonant structure is attuned to a wavelength of the RFID transponder, and wherein the resonant structure has a structural size of half the wavelength of the RFID transponder.

2. The system in accordance with claim 1,
wherein the apparatus is configured as one of a housing and a covering.

3. The system in accordance with claim 1,
wherein the wall is a metallic wall.

4. The system in accordance with claim 1,
wherein the resonant structure is arranged at a distance from the object attuned to the wavelength of the RFID transponder.

5. The system in accordance with claim 4,
wherein the resonant structure is arranged at a distance of a quarter of the wavelength of the RFID transponder.

6. The system in accordance with claim 1,
wherein the object has at least one second resonant structure.

7. The system in accordance with claim 1,
further comprising a second resonant structure and wherein the second resonant structure is arranged as a director between the slot structure and the object.

8. The system in accordance with claim 1,
further comprising a second resonant structure and wherein the second resonant structure is arranged as a reflector in an extension of the connection of the slot structure and the object.

9. The system in accordance with claim 1,
that has an RFID reading device to read information of the RFID transponder.

10. A method of reading an RFID transponder on an object in an apparatus for recording the object having at least one wall, wherein at least one resonant structure is arranged at a distance from the object, with the resonant structure being introduced into the wall as a slot structure, wherein the resonant structure is attuned to a wavelength of the RFID transponder, and wherein the resonant structure has a structural size of half the wavelength of the RFID transponder.

11. A system of an apparatus for recording at least one object and of an object arranged in the apparatus, wherein an RFID transponder having an antenna is arranged at the object, wherein the apparatus has at least one wall and at least one resonant structure spaced apart from the object, with the resonant structure being introduced into the wall as a slot structure, wherein the at least one resonant structure is arranged at a distance from the object attuned to a wavelength of the RFID transponder, and wherein the resonant structure is arranged at a distance of a quarter of the wavelength of the RFID transponder.

* * * * *